US011676299B2

(12) United States Patent
Gusikhin et al.

(10) Patent No.: US 11,676,299 B2
(45) Date of Patent: Jun. 13, 2023

(54) LOCATING A VEHICLE USING A DRONE (71) Applicant: Ford Global Technologies, LLC, Dearborn, MI (US)

(72) Inventors: Oleg Yurievitch Gusikhin, Commerce Township, MI (US); Omar Makke, Oakland, MI (US); Haysam M. Kadry, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 566 days.

(21) Appl. No.: 16/636,395

(22) PCT Filed: Aug. 7, 2017

(86) PCT No.: PCT/US2017/045803
§ 371 (c)(1),
(2) Date: Feb. 4, 2020

(87) PCT Pub. No.: WO2019/032091
PCT Pub. Date: Feb. 14, 2019

(65) Prior Publication Data
US 2020/0175252 A1 Jun. 4, 2020

(51) Int. Cl.
*G06V 20/13* (2022.01)
*H04W 4/42* (2018.01)
(Continued)

(52) U.S. Cl.
CPC .............. *G06V 20/13* (2022.01); *G06V 20/52* (2022.01); *H04N 7/185* (2013.01); *H04W 4/029* (2018.02);
(Continued)

(58) Field of Classification Search
CPC ............. G06K 9/0063; G06K 9/00771; G06K 2209/21; G06K 2209/23; H04N 7/185;
(Continued)

(56) References Cited

U.S. PATENT DOCUMENTS 9,044,543 B2 * 6/2015 Levien ................... A61M 5/20
9,056,676 B1 * 6/2015 Wang ........................ B64F 1/00
(Continued)

FOREIGN PATENT DOCUMENTS

CA         2402406 C   * 12/2009  ............ B60Q 1/085
CN       105388913 A      3/2016
(Continued)

OTHER PUBLICATIONS

International Search Report of the International Searching Authority for PCT/US2017/045803 dated Dec. 11, 2017.
(Continued)

*Primary Examiner* — Mahendra R Patel
(74) *Attorney, Agent, or Firm* — Brandon Hicks; Bejin Bieneman PLC (57) ABSTRACT A system that includes a computer and an unmanned aerial vehicle (UAV) is described. The computer may be programmed to receive, from the UAV, image data of a vehicle parking region; to process the data by identifying an actuation of a UAV indicator that occurs within a predetermined interval of a response of a vehicle in the region; and based on the identification, to determine a location of the vehicle.

20 Claims, 8 Drawing Sheets (51) Int. Cl.
*H04W 4/029* (2018.01)
*H04N 7/18* (2006.01)
*G06V 20/52* (2022.01)

(52) U.S. Cl.
CPC ........... *H04W 4/42* (2018.02); *G06V 2201/07* (2022.01); *G06V 2201/08* (2022.01)

(58) Field of Classification Search
CPC .... H04W 4/029; H04W 4/42; B64C 2201/12; B64C 2201/123; B64C 2201/127; B64C 39/024; G06T 2207/10032; G06T 2207/30204; G06T 2207/30236; G06T 7/73; G01C 21/34
USPC ....................................................... 382/103
See application file for complete search history.

(56) References Cited

U.S. PATENT DOCUMENTS

| | | | | |
|---|---|---|---|---|
| 9,471,059 | B1* | 10/2016 | Wilkins | B64D 47/08 |
| 9,783,293 | B2* | 10/2017 | Srivastava | G05D 1/101 |
| 9,835,709 | B2* | 12/2017 | Tran | G05D 1/106 |
| 9,849,981 | B1* | 12/2017 | Burgess | B64D 1/22 |
| 10,005,555 | B2* | 6/2018 | Mishra | B64D 47/00 |
| 10,240,930 | B2* | 3/2019 | Zhou | G01C 21/1656 |
| 2008/0059065 | A1* | 3/2008 | Strelow | G01S 19/14 |
| | | | | 342/357.52 |
| 2011/0102164 | A1* | 5/2011 | Ghabra | B60R 25/04 |
| | | | | 340/426.36 |
| 2014/0070929 | A1* | 3/2014 | Myers | B60R 25/10 |
| | | | | 340/426.18 |
| 2015/0106010 | A1 | 4/2015 | Martin et al. | |
| 2015/0339920 | A1* | 11/2015 | Cortelyou | G06V 10/245 |
| | | | | 340/907 |
| 2017/0039424 | A1* | 2/2017 | Nerayoff | G06T 7/32 |
| 2017/0161961 | A1* | 6/2017 | Salsberg | G06V 20/182 |
| 2017/0185956 | A1 | 6/2017 | Göllü | |
| 2019/0012636 | A1* | 1/2019 | Simon | G08G 7/00 |

FOREIGN PATENT DOCUMENTS

| | | | | |
|---|---|---|---|---|
| CN | 205264074 U | 5/2016 | | |
| CN | 205354374 U | 6/2016 | | |
| CN | 106409005 A | 2/2017 | | |
| DE | 102015001861 A1 | 3/2016 | | |
| WO | WO-2016154948 A1 * | 10/2016 | ........... | B64C 39/024 |
| WO | WO-2017219313 A1 * | 12/2017 | ........... | B64C 39/024 |

OTHER PUBLICATIONS

Machado et al., "Parking Enforcement via Drones—User Manual", ECS 193, Winter/Spring 2016.

* cited by examiner

LOCATING A VEHICLE USING A DRONE

BACKGROUND

Finding a certain vehicle in a large parking structure may require a person moving from vehicle-to-vehicle to identify the particular vehicle. In some instances, the person may examine the license plate of each vehicle to determine whether it is the sought-after vehicle. And when a large quantity of vehicles is located in the parking structure, this may be a time-consuming endeavor.

DETAILED DESCRIPTION

A vehicle locating system is described that includes a computer and an unmanned aerial vehicle (UAV). According to one illustrative example, the computer can include comprising a processor and memory storing instructions executable by the processor, the instructions including, to: receive, from a UAV, image data of a vehicle parking region; process the data by identifying an actuation of a UAV indicator that occurs within a predetermined interval of a feedback response of a vehicle in the region; and based on the identification, determine a location of the vehicle within the region.

According to the at least one example set forth above, the response includes a light pattern emitted from the vehicle in response to a trigger from the UAV.

According to the at least one example set forth above, the indicator includes a light source located within a field of view of a sensor onboard the UAV.

According to the at least one example set forth above, the system further includes the UAV, and the UAV is programmed to record the image data and repeatedly emit a wireless command to trigger the response as it moves from waypoint-to-waypoint within the region.

According to the at least one example set forth above, the command includes a keyfob code of the vehicle, wherein the UAV is programmed to operate in a plant mode which inhibits the UAV from rolling the code.

According to the at least one example set forth above, the system further includes a plurality of vehicles in the region including the vehicle that provides the response, wherein each of the plurality comprise an onboard computer programmed to execute the response when the UAV provides a wireless command that corresponds with a keyfob code stored in the respective onboard computer.

According to another illustrative example, an unmanned aerial vehicle (UAV) is disclosed that includes: a computer, comprising a processor and memory storing instructions executable by the processor; a sensor; and a keyfob transmitter, the instructions include, to: receive, via the sensor, image data of a vehicle parking region; transmit a wireless command via the transmitter; and based on the transmission, receive, via the sensor, and record a visual feedback response from a vehicle in the region.

According to the at least one example set forth above, the sensor is a digital camera.

According to the at least one example set forth above, the image data is video data.

According to the at least one example set forth above, the response includes a light pattern emitted from a headlamp of the vehicle.

According to the at least one example set forth above, the UAV further includes an indicator located within a field of view of the sensor.

According to the at least one example set forth above, the indicator is coupled adjacent an aperture of the sensor.

According to the at least one example set forth above, the indicator comprises a light source, wherein the instructions further comprise: to transmit the command and, concurrently, to actuate the source.

According to the at least one example set forth above, wherein the instructions further include, to: repeatedly transmit the command at a plurality of waypoints in the region while recording image data, wherein the data comprises the response and an actuation of the indicator; and then transmit the data to a second computer for video image processing, wherein the processing includes identifying the vehicle based on both the actuation and the response occurring within a predetermined interval.

According to the at least one example set forth above, the instructions further include: to determine location data associated with the vehicle providing the response.

According to the at least one example set forth above, the instructions further include: process the image data at the UAV; based on the processing, determine location data of the vehicle; and provide the location data to a second computer.

According to the at least one example set forth above, a system that includes the UAV and the second computer that is programmed to maintain a database of keyfob codes for a plurality of vehicles, wherein the command transmitted by the UAV includes one of the codes.

According to another illustrative example, a method includes: receiving, from an unmanned aerial vehicle (UAV), image data of a vehicle parking region; processing the data by identifying an actuation of a UAV indicator that occurs within a predetermined interval of a feedback response of a vehicle in the region; and based on the identification, determining a location of the vehicle.

According to the at least one example set forth above, the response is triggered by the UAV emitting a keyfob code in a direction of the vehicle.

According to the at least one example set forth above, the indicator comprises a light source located within a field of view of the image data and the response comprises a light pattern emitted by the vehicle.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above. According to the at least one example, a computer program product is disclosed that includes a computer readable medium that stores instructions executable by a computer processor, wherein the instructions include any combination of the examples of the method(s) set forth above.

Figure 1:
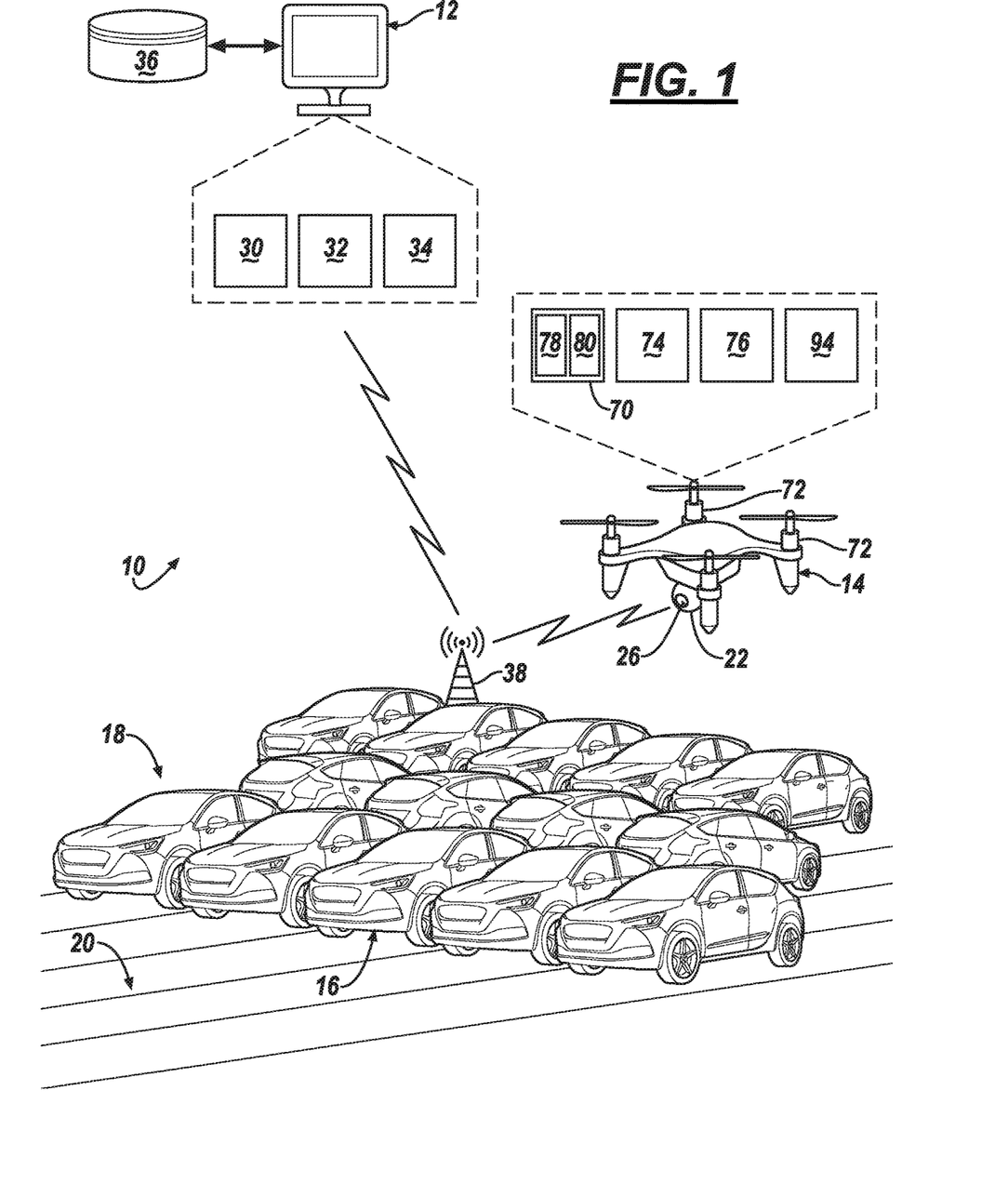
FIG. 1 illustrates a vehicle-locating system that includes a computer and an unmanned aerial vehicle (UAV).

Now turning to the figures, wherein like numerals indicate like parts throughout the several views, there is shown a vehicle locating system 10 that includes a plant computer 12 and an unmanned aerial vehicle (UAV) 14. In vehicle plant settings, service personnel often need to locate or find a specific vehicle 16—e.g., for inspection purposes, software update purposes, etc. System 10 can assist such personnel in finding vehicle 16 from among potentially hundreds or thousands of vehicles 18—e.g., located in a vehicle parking region 20 of the plant. A vehicle plant may comprise a manufacturing or assembly facility, a vehicle storage facility, a maintenance facility, or the like. Further, the description which follows is illustrated in the context of a vehicle plant; however, this is merely one example. Other suitable locations and applications are possible as well such as valet services or the like.

According to at least some examples, the UAV 14 may receive, from the computer 12, a unique vehicle identifier such as a keyfob code for the specific vehicle 16 which may be located in the parking region 20. Thereafter, the UAV 14 may use an onboard sensor 22 to find the vehicle 16—e.g., by capturing image data of the parking region 20 while it repeatedly transmits the code throughout region 20 (e.g., moving through a series of predetermined waypoints). In at least one example, the UAV 14 may have an onboard indicator 26 (e.g., such as a light source) which emits a signal each time the code is transmitted, and these emissions may be captured within the image data (e.g., by locating the indicator within a field-of-view (FOV) of the sensor 22). When the specific vehicle 16 receives the keyfob code (e.g., when the UAV 14 is within proximity thereof), the vehicle 16 may emit a response (e.g., such as flashing its headlamps). At this time, the vehicle 16 may or may not be within a FOV of the UAV sensor 22; however, when vehicle 16 is within the FOV, the UAV 14 may capture within the image data that includes both the signal (e.g., light source illumination) of indicator 26 and a response (e.g., flashing headlamps) from the vehicle 16. Thus, the vehicle 16 may be located, in part, by identifying the signal and response within a predetermined interval of time. As will be described below, in one example, the UAV 14 may have sufficient memory to store image processing algorithms (and/or software) and have adequate processing speed and capability to execute such algorithms in so-called real-time—thus, in one example, UAV 14 may perform the identification. In other examples, UAV 14 may not perform this identification. Instead, UAV 14 may provide the image data to computer 12, and computer 12 may determine the location of vehicle 16—e.g., by processing the image data, identifying vehicle 16, and also determining location data thereof.

Thus, it will be appreciated that once an identification of the corresponding signal and response are determined, this identification may be matched to an indication of where in the parking region 20 the identification occurred (e.g., so that service personnel may locate the vehicle 16). According to one example, image data captured by the UAV 14 may be timestamped, and the UAV may record a timestamped datalog of its movement in the parking region 20; these two sets of data may be correlated to determine location data of the vehicle 16. In one example, the UAV 14 moves according to the series of waypoints—e.g., capturing image data at each waypoint; thus, a timestamp (or time range) of each waypoint may be stored by UAV 14 as well. In other examples, other identifying information (e.g., such as markings on or near the parking region 20) may be captured within the image data—and the UAV 14 and/or computer 12 may identify the location data of vehicle 16 using this identifying information. Ultimately, when the vehicle's location data is determined, it may be provided to the service personnel which thereafter may perform any suitable service to the vehicle 16.

Computer 12 may comprise a single computer or multiple interconnected computing devices. For example, in at least one instance, computer 12 is a manufacturing or assembly plant computer which is connected to an intranet of other computers, plant systems, and/or plant subsystems. Computer 12 may comprise at least one processor 30 coupled to memory 32. For example, processor 30 can be any type of device capable of processing electronic instructions, non-limiting examples including a microprocessor, a microcontroller or controller, an application specific integrated circuit (ASIC), etc.—just to name a few. In general, computer 12 may be programmed to execute digitally-stored instructions, which may be stored in memory 32, which enable the computer 12, among other things, to: receive, from UAV 14, image data of the vehicle parking region 20; process the image data by identifying an actuation of the UAV indicator 26 that occurs within a predetermined interval of a response of specific vehicle 16 which may be located within the region 20; and based on the identification and image data, determine a location of the vehicle 16. These and other instructions will be explained in greater detail below.

Memory 32 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 32 may store one or more computer program products which may be embodied as software, firmware, or the like.

Computer 12 further may comprise a transceiver 34 which enables communication between it and the UAV 14. Transceiver 34 may include a docking connector for mating with the UAV 14 (e.g., in wired implementations); however, in at least one example, transceiver 34 facilitates wireless communication. For example, according to one example, the transceiver 34 comprises an antenna (not shown) and a short-range wireless chipset (not shown); the chipset may facilitate communications via one or more protocols, such as Wi-Fi, Wi-Fi Direct, Bluetooth, Bluetooth Low Energy (BLE), or the like. In other examples, transceiver 34 may facilitate long-range wireless communication (e.g., comprising an LTE, CDMA, GSM, etc. chipset or the like); other communication techniques (e.g., including satellite communication) are also possible. In at least one example, the computer 12 communicates with UAV 14 via a BLE protocol—e.g., thereby requiring less power of the untethered UAV 14.

In at least one example, the computer 12 includes at least one database 36 as well. The database 36 may comprise any suitable memory or a securely-connected server which stores, among other things, unique vehicle identifiers for the plurality of vehicles 18 (e.g., which includes vehicle 16). According to one example, the database 36 maintains a record for each vehicle 18, and each record comprises one or more identifiers. For example, each record may comprise a keyfob code, a vehicle identification number (a so-called VIN), or the like. In some examples, the record could comprise a license plate identifier as well; however, it will be appreciated that in a vehicle plant environment, such vehicles typically will not yet be licensed (hence, they will not have a license plate identifier).

Figure 2:
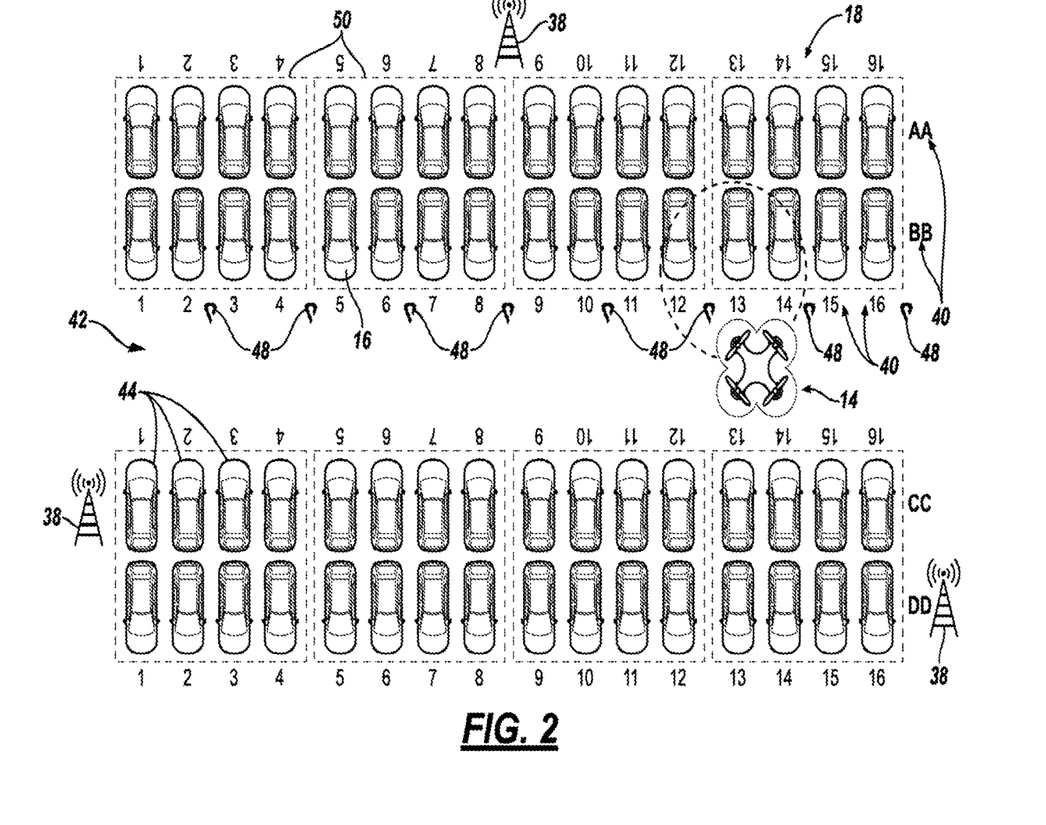
FIG. 2 schematically illustrates a top view of a vehicle parking region.

According to at least one example, the computer 12 may be located at a vehicle plant which includes parking region 20. Due to the dimensions of a typical vehicle plant, short-range wireless communication may be facilitated via a number of wireless signal repeaters 38 being spaced from one another, as well as being located between the computer transceiver 34 and the parking region 20. Further, the parking region 20 itself may have multiple repeaters 38 spaced from one another as well (e.g., around and within a perimeter of the region 20). The spacing of such repeaters 38 may be based on an expected attenuation range of the wireless signals—e.g., being based in part on the wireless protocol being used. According to one additional location data example, the UAV 14 may determine its location data in the parking region 20 (and consequently the identified vehicle 16) using triangulation techniques and the signals from the repeaters 38.

The vehicle parking region 20 may be a gravel or paved pad (e.g., covered or uncovered), a parking garage, or the like. Further, in at least some examples, the region 20 comprises a plurality of location identifiers 40. Non-limiting examples include alphanumeric markings painted on or adhered to a surface 42 of the region 20, signage with alphanumeric markings, unique lighting or other wireless signals indicating a region, etc. In FIG. 2, the identifiers 40 comprise row and column markings on surface 42 (e.g., rows AA, BB, CC, DD, etc. and columns 1, 2, . . . , 16, . . . ); of course, this is merely one example. Other suitable identifiers 40 include signage and/or a unique marking for each parking space 44 in the region 20.

As will be described in greater detail below, the region 20 may be plotted using a plurality of waypoints 48. Each waypoint 48 may have a unique set of GPS coordinates (e.g., having precision of 5-7 decimal places) and/or internet protocol version 6 (IPV6) addresses. Further, the spacing and locations of the waypoints 48 may be associated with a field-of-view (FOV) of the sensor 22 on UAV 14 (e.g. how much space it may capture at one instant in time), may be according to groupings 50 of parking spaces 44 (or vehicles 18), a combination thereof, or the like.

Each of the vehicles 18 (which includes specific vehicle 16) is shown as a passenger car; however, vehicles 18 could also be trucks, sports utility vehicles (SUVs), recreational vehicles, buses, train cars, marine vessels, aircraft, or the like. According to one example (see FIG. 3), each vehicle 18 may comprise an electronic control module 52 (e.g., such as a so-called body control module) which is responsive to wireless commands (that include a keyfob code) from a transmitter of a keyless entry device (e.g., such as a vehicle keyfob). For example, the module 52 may comprise a computer that includes one or more processors, memory, and a wireless receiver—the receiver being responsive to commands from an associated keyfob regardless of whether the vehicle ignition is ON or OFF. In this manner, when a user of the vehicle 18 depresses a switch on the keyfob, the module 52 may receive the command, verify the keyfob code, and perform a vehicle function (designated within the command as well)—e.g., such as locking or unlocking vehicle doors, starting vehicle ignition, actuate panic function (e.g., honking the vehicle horn and/or flashing vehicle lights), etc. In some examples of performing the vehicle function, the module provides a feedback response to the user (e.g., so that the user knows that the function has been performed). For example, when the module 52 receives a command to lock the doors, the module 52 may actuate both the vehicle door locks 54 as well as flash vehicle headlamps 56, honk a vehicle horn 58, and/or the like. In this manner, the user—who may be a distance away—knows that the vehicle 18 executed the wireless command. In at least one example, the headlamps 56 emit a predetermined light pattern with at least some wireless commands. The light pattern may include one or more flashes, each flash having a predetermined ON duration (and where multiple flashes are used, each non-flash duration between flashes may have a predetermined OFF duration). As will be explained in greater detail below, the UAV 14 may transmit a wireless command that includes the keyfob code, and a feedback response (e.g. such as the light pattern) may be received by the UAV 14 and used to identify the specific vehicle 16 from among other vehicles 18.

FIGS. 1 and 4-6 illustrate aspects of the unmanned aerial vehicle (UAV) 14 (e.g., a so-called drone). UAV 14 may be any suitable aircraft which is operated and controlled at least partially, if not entirely, by a computer 70 onboard the UAV 14 itself which enables the UAV to be operated in a fully autonomous mode, wherein no human interaction or control is required. In at least one example, the UAV 14 may hover using one or more propeller assemblies 72; this is merely one example (and other UAV flight techniques may be employed instead or in addition thereto).

In general, UAV 14 comprises the computer 70, sensor 22, a wireless transceiver 74, and a keyfob transmitter 76. Computer 70 comprises at least one processor 78 and memory 80 that stores instructions executable by the at least one processor 78. Processor 78 may be similar or identical to processor 30 (described above with respect to computer 12), and memory 80 may be similar or identical to memory 32 (also described above with respect to computer 12); therefore, this hardware will not be re-described here. However, memory 80 stores instructions different than that stored in memory 32; instructions stored in memory 80 are executable by processor 78 and specially configure computer 70 to carry out different tasks. For example, computer 70 may be programmed with instructions that include, among other things: to receive and/or store a keyfob code from computer 12; to control UAV flight; to control UAV steering; to control UAV stabilization; to control UAV navigation; to move the UAV 14 through a series of waypoints 48; to receive and/or record image data, via sensor 22, of the vehicle parking region 20; to store the image data in memory 80; to transmit a video feed of the image data to computer 12; to provide a recorded video clip of vehicles 18 as UAV 14 moves in parking region 20; to transmit a wireless command (which includes a keyfob code), via the transmitter 76, to the vehicles 18 seeking to identify specific vehicle 16 (and to repeat this transmission); to inhibit rolling or hopping of the keyfob code at computer 70; to receive and/or record (via sensor 22) a response from vehicle 16; to actuate the indicator 26 on the UAV 14 when the transmitter 76 sends the command; to process image data using image processing algorithms, instructions, and/or any other suitable technique; and to execute any combination of the exemplary instructions listed herein.

According to one example, the image processing is performed by processor 78 and may comprise: analyzing multiple video frames of image data; determining which frames include both the response from vehicle 16 (e.g., a light pattern emission from headlamps 56) and an indication from indicator 26 (e.g., an illumination); identifying vehicle 16 based on the response and indication occurring within a predetermine interval of one another; and determining location data of vehicle 16 using any suitable technique. As will be explained below, determining location data may include storing GPS coordinates of vehicle 16 (once the indication and corresponding response are identified), triangulating position using wireless signals from repeaters 38, and/or using location identifiers 40 on or near the parking region 20. The image processing instructions also may be executable singly or in any suitable combination with one another. Further, any instructions discussed above are merely examples; other instructions may be stored by memory 80 and executed by processor 78 as well.

Figure 4:
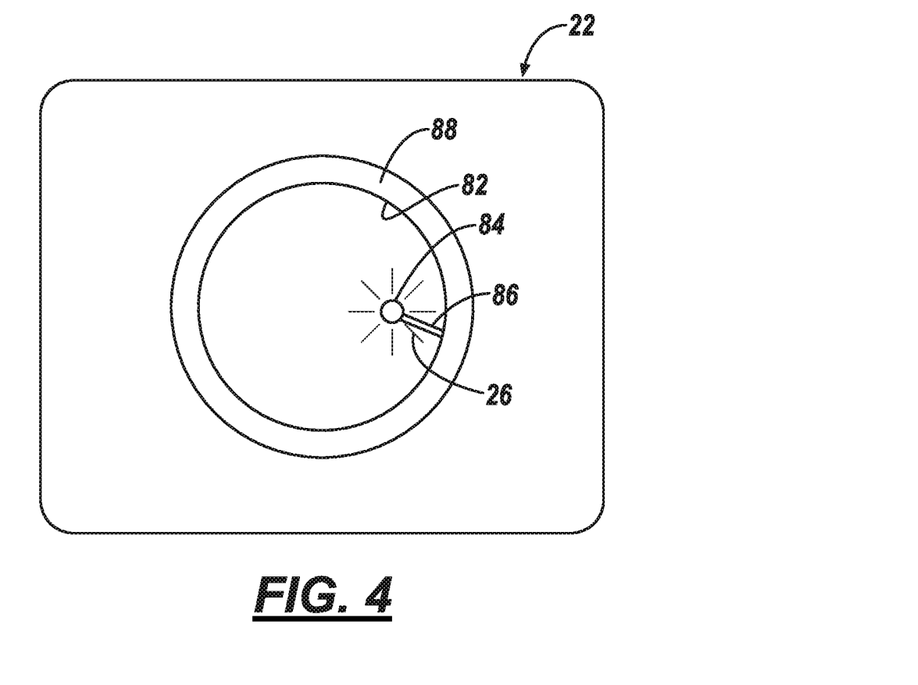
FIG. 4 is a schematic diagram of a sensor carried by the UAV.
Figure 5:
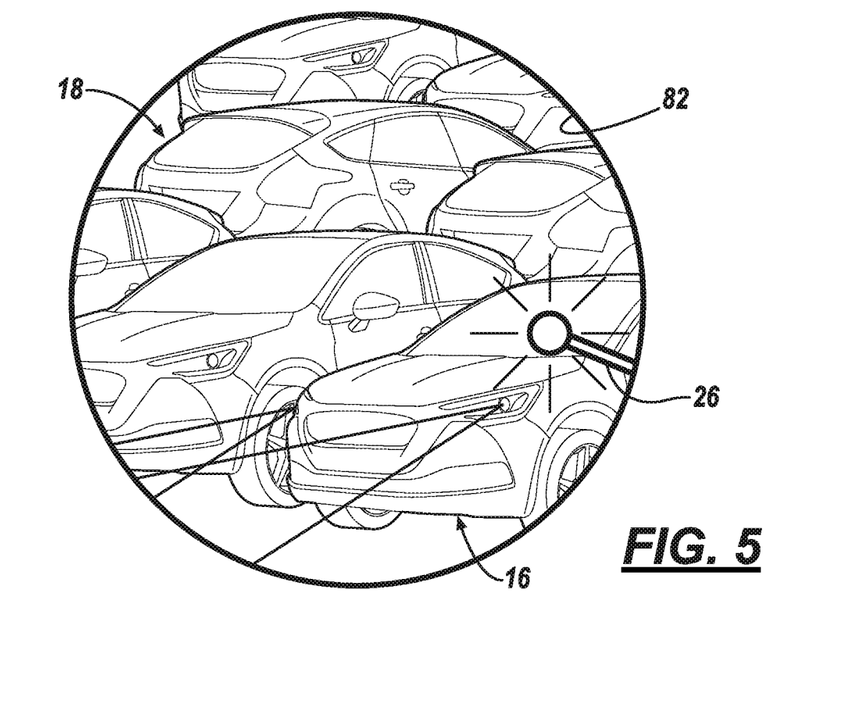
FIG. 5 is an exemplary field-of-view of the sensor.

As used herein, the sensor 22 onboard UAV 14 comprises an input device that is configured to detect a feedback response generated by vehicle 16 when the keyfob transmitter 76 sends a wireless command (that includes a suitable keyfob code). For example, sensor 22 may comprise a digital camera (e.g., a complementary metal oxide semiconductor (CMOS) device, a charge-coupled device (CCD), or the like), an image intensifier (so-called i-squared device), or the like, just to name a couple of non-limiting examples. Sensor 22 may comprise an aperture 82 (e.g., typically having a cover or lens located therein) that is spaced from a detector or imaging plane (not shown)—the aperture 82 permitting light to impinge upon the detector.

The indicator 26 may be any suitable device which, when actuated by computer 70, provides an indication of its actuation. In at least one example, the indication is a visual indication. For example (FIG. 4), indicator 26 may comprise a light source 84 located within a field-of-view (FOV) of the detector which, when triggered by computer 70, illuminates. The light source 84 may be any suitable light emitting device (e.g., such as a light-emitting diode or LED). In at least one example, the indicator 26 comprises an arm 86 which is coupled to a body 88 of the sensor 22, wherein the arm 86 is adjacent to the aperture 82 so that light from the light source 84 is captured within the detector's FOV.

Figure 6:
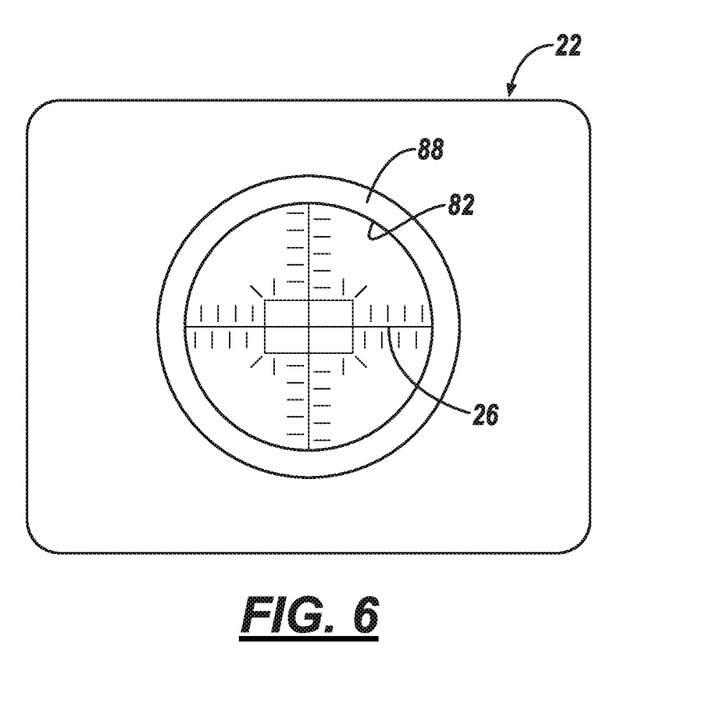
FIG. 6 is a schematic diagram of another example of a sensor carried by the UAV.

Other indicator examples exist. For example, FIG. 6 illustrates a sensor 22' having a body 88', an aperture 82', and an indicator 26'. Here, indicator 26' is a reticle. For example, the reticle may be illuminated when triggered by computer 70. In another indicator example, one or more predefined pixels or pixel arrangements could be introduced by computer 70 into the video data, and the presence of these pixels in the frames of video data could indicate transmission of the keyfob code. Still other examples exist.

Wireless transceiver 74 may enable communication between, among other things, UAV 14 and computer 12. Transceiver 74 may include an antenna (not shown) and a short-range wireless chipset (not shown); the chipset may facilitate communications via any suitable protocol, such as Wi-Fi, Wi-Fi Direct, Bluetooth, Bluetooth Low Energy (BLE), or the like. In other examples, transceiver 74 may facilitate long-range wireless communication (e.g., comprising an LTE, CDMA, GSM, etc. chipset or the like); other communication techniques (e.g., including satellite communication) are also possible. Transceiver 34 (computer 12) and transceiver 74 (UAV 14) may be matched—e.g., in order to facilitate communication therebetween. And in at least one example, the wireless transceiver 74 has a BLE chipset and utilizes a BLE protocol.

Keyfob transmitter 76 of UAV 14 may comprise a microprocessor (not shown) coupled to a wireless chipset (not shown) operating in a frequency range suitable for performing one or more remote keyless entry functions (in one example, at a frequency of approximately 315 MHz). Unlike handheld keyfobs, transmitter 76 may not be coupled to any user-actuatable pushbuttons (but instead may be actuated by computer 70 onboard the UAV). For example, when processor 78 actuates the transmitter 76, the transmitter chipset may transmit a wireless command to the vehicles 18. As discussed above, the command may comprise an instruction to perform a vehicle function coupled with a keyfob code. When the associated vehicle 16 receives the command (and verifies the code), the vehicle 16 may perform the instruction—in a manner similar to the vehicle 16 receiving the command from a handheld keyfob. Continuing with the example above, when the vehicle 16 receives at least one command, the vehicle doors locks may be actuated (to a locked state) and the headlamps 56 may flash.

When conventional handheld keyfobs are actuated by a user depressing a pushbutton, the microprocessor within keyfob typically rolls (or hops) the code to avoid replay attacks. As will be appreciated by skilled artisans, replay attacks include a malicious eavesdropper recording the transmitted code and replaying it coupled with an instruction to unlock the doors, start the vehicle ignition, etc. (e.g., permitting the eavesdropper to enter the vehicle and/or drive it away). To avoid this, handheld keyfobs may be programmed to roll the code—i.e., to advance the code to a next keyfob code in a sequence (e.g., as calculated by an algorithm executed by the keyfob's microprocessor). Thus, when the keyfob is next actuated (by a user pushing a button), the next wireless command uses a different code in a sequence determined by the algorithm. The corresponding vehicle (e.g., more particularly, computer 52) which operates according to the handheld keyfob typically is configured with the same algorithm. Thus, when computer 52 receives the command with a different code, the computer 52 is programmed to determine whether the new code matches one of a predetermined quantity (e.g., 256) of other codes determinable using the sequencing algorithm. For example, a different code may be received by computer 52 when the handheld keyfob buttons have been depressed one or more times but the wireless command has not reached the computer 52 (e.g., each time a conventional keyfob pushbutton is depressed, the keyfob code may be rolled—e.g., resulting in a later mismatch). If a match is discovered (by computer 52) among the predetermined quantity of other codes, the computer 52 updates its memory (as to the keyfob code last used by the handheld keyfob) and also executes the instruction sent from the handheld keyfob. Essentially, the computer 52 synchronizes the latest-used keyfob code in its memory. (If no match is found, the handheld keyfob is no longer paired to the computer 52—e.g., authorized service personnel will need to perform a special re-pairing procedure in order for the handheld keyfob to be operable again).

In the instant case, the keyfob transmitter 76 may be programmed to operate in a plant mode, wherein in the plant mode the transmitter 76 does not roll the keyfob code every time it transmits a wireless command—e.g., as it searches the parking region 20. Thus, as parking region 20 may be extremely large (and as will be described more below), UAV 14 may transmit the code repeatedly outside of a wireless range of the specific vehicle 16 without rolling the keyfob code more than the predetermined quantity of times. In at least one example, this predetermined quantity may be zero. In this manner, the UAV 14 (and its transmitter 76) may not undesirably render the transmitter 76 inoperable—and be unable to receive the desired feedback response from specific vehicle 16.

In addition to the components listed above, the UAV 14 further may comprise a positioning unit 94 which may include any suitable computing device which can provide global and/or local location data to computer 70. For example, positioning unit 94 may receive location data (e.g., such as latitude and longitude (LAT/LONG) coordinate data) from one or more satellites. Non-limiting satellite types and location systems include GPS and GLONASS. Further, using unit 94, UAV 14 may move according to a predetermined flight plan through parking region 20—the flight plan including a series of predetermined waypoints 48, as well as pause periods at one or more of the waypoints. For example, according to one flight plan, the pause period at each waypoint 48 may be similar or identical—e.g., permitting sufficient time for each of the target vehicles 18 within a current field-of-view of UAV sensor 22 to provide a feedback response.

Figure 7:
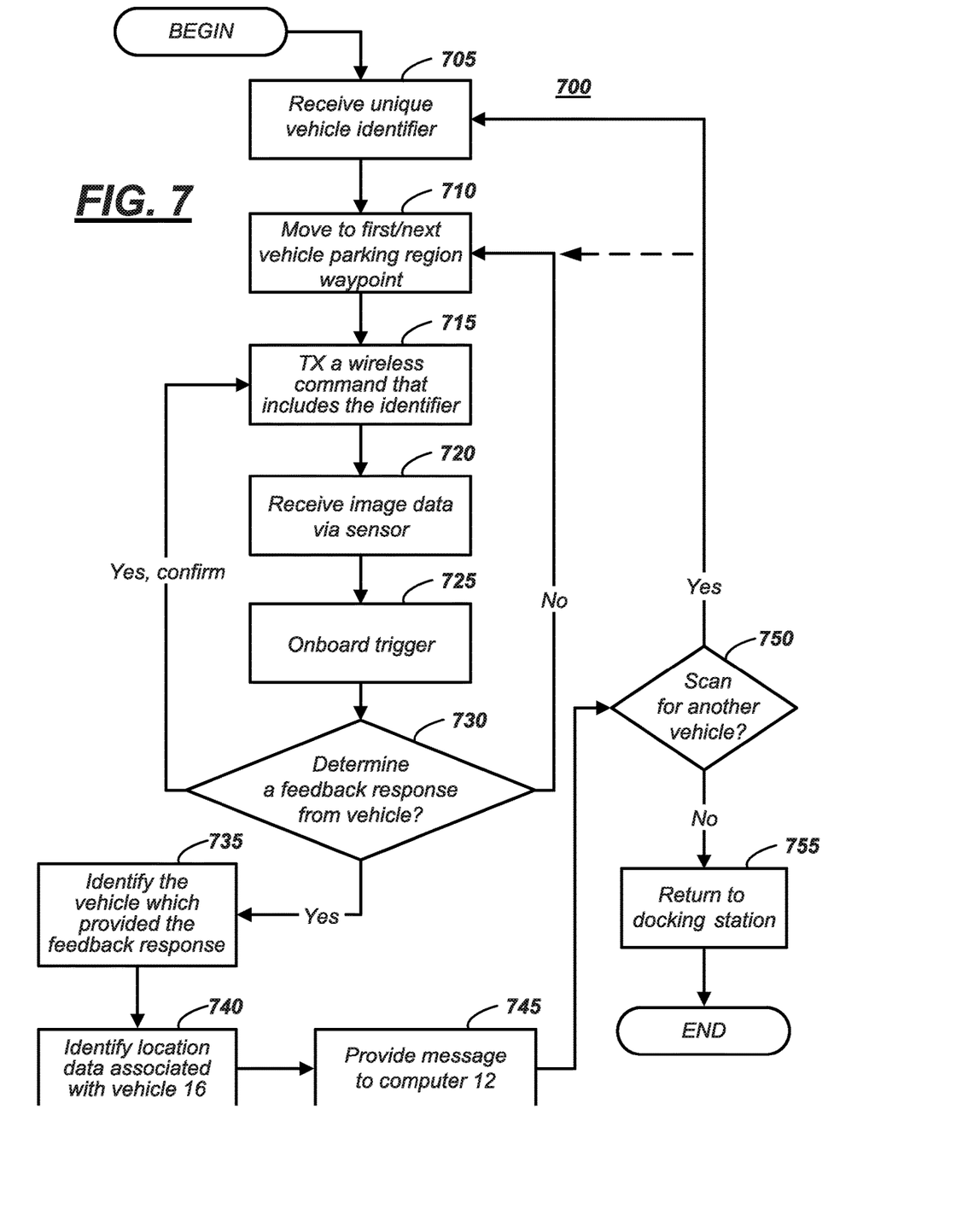
FIGS. 7-9 are flow diagrams illustrating sets of instructions which may be executed by the computer and/or UAV.
Figure 8:
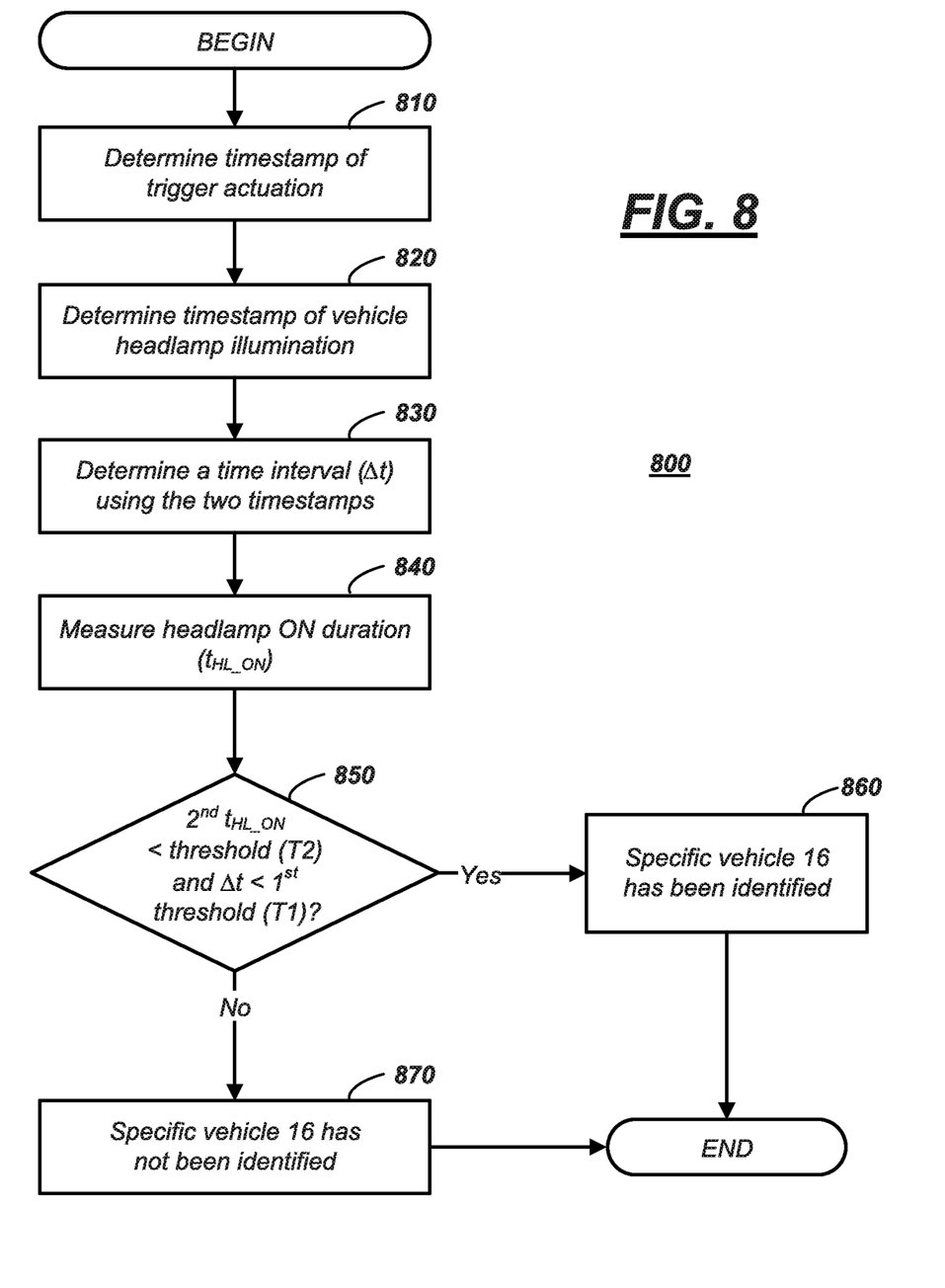
Figure 9:
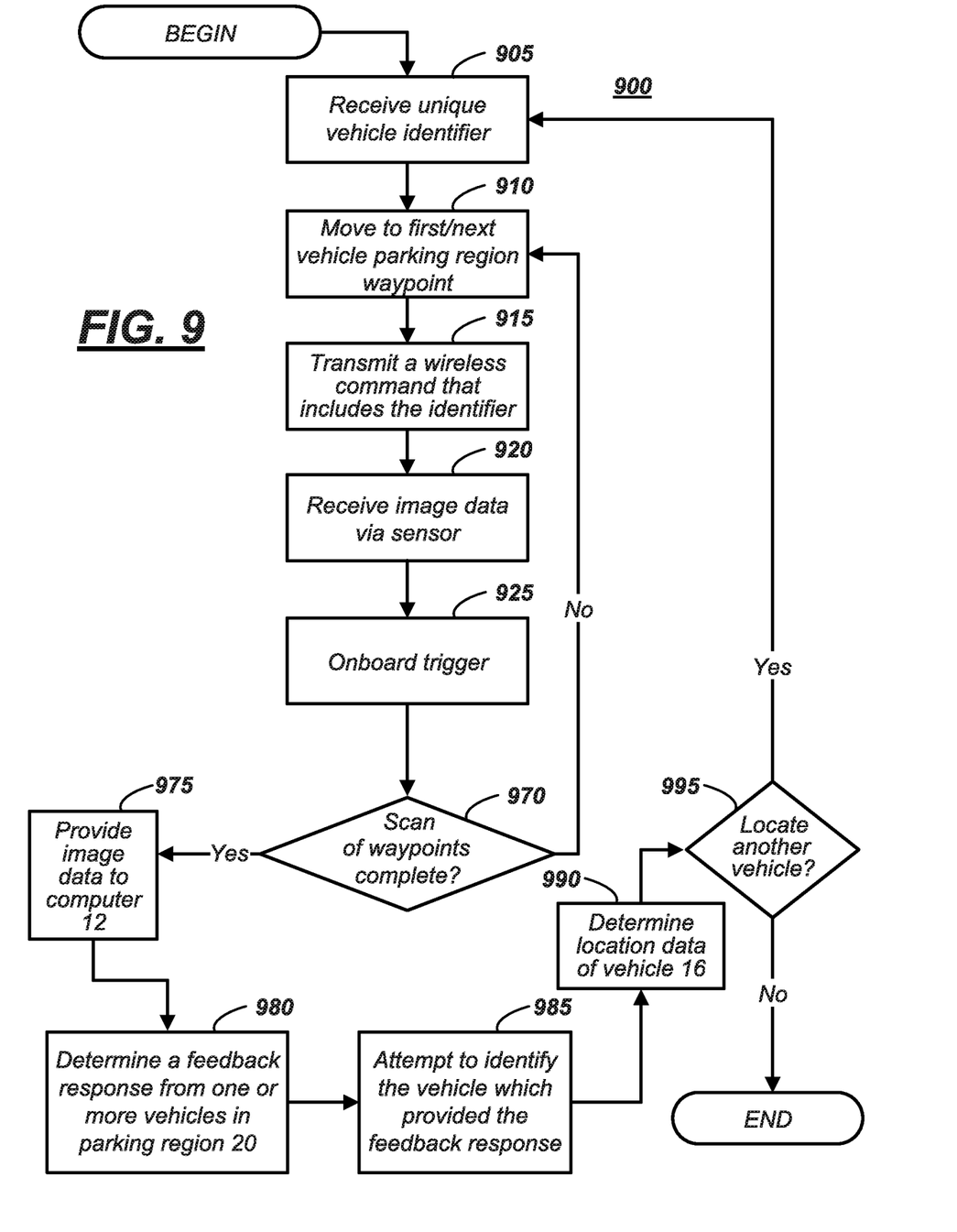

Turning now to FIGS. 7-9, these flow diagrams illustrates processes 700, 800, 900 which may be carried out by one or more computing devices of vehicle-locating system 10. These processes are intended to illustrate uses and applications of the system 10 and are not intended to be limited to the examples set forth therein.

Process 700 may begin with block 705—the UAV 14 receiving a unique identifier from plant computer 12 (e.g., via transceiver 74). For example, a service technician or computer 12 itself may determine that service is required on a specific vehicle 16 from among a plurality of vehicles 18, and vehicle 16 may be located in some unknown location of parking region 20. For purposes of illustration only, the technician or computer 12 may determine that vehicle 16 needs the latest telematics software update. The identifier provided by the computer 12—by wire or wirelessly to UAV 14—may be a keyfob code or may include a keyfob code of the specific vehicle 16 which the UAV 14 may use to locate the vehicle.

In block 710, UAV 14 may navigate or move to a first (or next) waypoint 48 in the parking region 20. For instance, in at least one example, computer 70 onboard UAV 14 may be programmed to navigate a predetermined series of waypoints 48 using positioning unit 94. To illustrate, these waypoints 48 may include a loop from a docking station (not shown) to the parking region 20, through a series of spaced waypoints 48 in the parking region (e.g., to search for vehicle 16), and a return path of waypoint(s) to the docking station again. (Later in process 700, block 710 may be repeated, and then, block 710 will move to the 'next' waypoint 48 in the predetermined series).

In block 715, at the waypoint of block 710, the UAV 14 may instruct the keyfob transmitter 76 to transmit a wireless command that may include the identifier (e.g., the keyfob code) received from computer 12. This command may be transmitted in a direction of a plurality of vehicles 18 in parking region 20—e.g., at the current waypoint 48—in order to trigger a feedback response of the sought-after vehicle 16. According to one example, multiple vehicles 18 may receive the keyfob code and a vehicle instruction (and each vehicle 18 that receives the code may use its onboard computer 52 to determine whether code matches its stored keyfob code). According to one example set forth above, the vehicle instruction may be adapted to actuate the vehicle door locks to the locked state (e.g., even if the locks on the vehicle 16 are already in the locked state). Based on the programming of the vehicle 16, it may be anticipated by UAV 14 that the vehicle 16—when it receives the wireless command will not only execute the instruction (based on the keyfob code), but may also provide a feedback response such as flashing of the vehicle headlamps 56 (e.g., once or twice).

In block 720, UAV 14 may hover over the respective waypoint 48 while receiving image data from sensor 22 (e.g., image data that includes all or a part of the portion of the parking region 20 at which the wireless command was directed). In at least one example, this image data is video data or a video stream of data (e.g., multiple, sequential frames). Block 720 may occur at least partially concurrently with block 715. In some instances, once UAV 14 reaches the first waypoint 48 in the parking region 20, it may receive, record, and/or store image data (e.g., until the entire parking region 20 is imaged or until vehicle 16 is identified). Hence, in some examples, image data may be received at least just prior to block 715. In other examples, snippets of video data are captured at each waypoint 48 (e.g., to conserve memory space onboard UAV 14).

In block 725, UAV 14 may execute, via computer 70, an onboard trigger. According to one example, the trigger actuates indicator 26; and in at least one example, the trigger actuates light source 84 causing it to illuminate. As described above, the light from source 84 may be located within the field-of-view of the sensor 22; consequently, the image data may include the illumination. This illumination may be temporal—e.g., having a predetermined duration (e.g., one or two seconds). Block 725 also may be executed at least partially concurrently with block 715 and block 720. In some instances, execution of block 725 may lag the execution of blocks 715 and 720; however, this lag may be less than one second (e.g., even less than 500 milliseconds in some examples). The use of indicator 26 (e.g., embodied as an actuatable light source 84) may reduce the need for complex software to correlate the transmission of a keyfob code transmission (block 715) with the video data which may be recorded by UAV computer 70.

Other examples of block 725 include an onboard trigger that causes an internal actuation such as an actuation of an electronic circuit, a switch, a counter, or the like (e.g., not captured by the image data of sensor 22). In at least one example of this nature, the trigger is the execution of the wireless command. This implementation may be suitable when the UAV 14 executes onboard image processing to determine the feedback response from the vehicle 16; in these instances, the UAV 14 may be able to correlate a feedback response from vehicle 16 with its own internal actuation. In other instances (e.g., where the computer 12 analyzes the image data, instead of UAV computer 70), a visible actuation that is captured within the image data may be desirable. For purposes of illustration only, the remainder of process 700 describes the indicator 26 as external to sensor 22 (e.g., as the previously described light source 84).

In block 730—which follows the execution of blocks 715-725, the computer 70 determines whether a feedback response was received from among at least some of the plurality of vehicles 18 which received the wireless command in block 715. For example, in some instances, block 730 may pertain to only vehicles 18 within a field-of-view of the sensor 22 (e.g., at the time of the execution of blocks 715-725). If a feedback response (e.g., such as a flashing of vehicle headlamps 56) is determined in response to transmitting the wireless command (e.g., which had the keyfob code of vehicle 16), UAV 14 may determine a high likelihood that it has found specific vehicle 16. Further identification of the vehicle 16 may be required however, and an example of this further identification is described below in block 735 (which may follow).

According to at least one example, process 700 loops back and repeats blocks 715, 720, and 725 in order to see if re-executing these instructions results in a second, similar feedback response from the vehicle. In this case, if the headlamps 56 flash of the same vehicle flash again as a result of the second attempt, then UAV 14 may execute process 800 to further identify whether it has located vehicle 16.

In block 730, if no feedback response is received (or if no second feedback response is received upon re-execution of blocks 715, 720, 730 in the confirmation attempt), then process 700 may loop back to block 710 and move to the next waypoint 48. Thereafter, the process 700 may proceed as already described above.

In block 735, UAV computer 70 may identify the vehicle which provided the feedback response—e.g., thereby confirming that the headlamp flashing was not coincidence. In at least one example, this identification may include additional analysis of the image data received by sensor 22, analysis of the timing of the feedback response from the vehicle compared with the timing of the wireless command, and the like. An example of a set of instructions which may be executed to identify the vehicle 16 will be described more below in process 800.

In block 740 which follows, the computer 70 may identify location data of the identified vehicle 16. For example, computer 70 may determine where in parking region 20 the vehicle is located. According to one example, using transceiver 74, UAV 14 may triangulate position of vehicle 16 relative to several wireless repeaters 38 having known locations in the parking region 20. Or using computer 70, UAV 14 may execute optical character recognition processing algorithms which enable UAV 14 to determine location data of vehicle 16 using location identifiers 40 in the parking region 20 (e.g., such as signage, markings on surface 42 of parking region 20, and the like).

In other examples, UAV 14 may simply record location data and download it to computer 12, which then performs the image processing (and ultimately determines the location of vehicle 16). For example, UAV 14 may transmit this data to computer 12 as it moves through waypoints 48 in parking region 20, or it may store the image data (which may or may not include this location data) in memory 80 and later provide it to computer 12.

Continuing with the example wherein UAV 14 identifies the vehicle 16 and its respective location data, in block 745 which follows, UAV 14 may provide a message to computer 12 indicating it has found vehicle 16 (e.g., using transceiver 74). This message may include the location data as well. Thereafter, the service technician may retrieve the vehicle 16 and update the telematics software therein.

Following block 745, process 700 may include UAV 14 determining to scan parking region 20 for another vehicle (e.g., like vehicle 16) (see block 750). If UAV 14 has or receives instructions to seek another vehicle in block 750, then process 700 loops back to block 710 and repeats the respective instructions, as described above. Otherwise, process 700 may proceed to block 755 wherein the UAV 14 returns to its docking station and the process ends.

Turning now to FIG. 8, process 800 further identifies the specific vehicle 16 using the image data acquired by UAV 16 and attempts to eliminate potential false-positive determinations. Recall that prior to process 800, the image data included a feedback response (e.g., such as the flashing of vehicle headlamps 56). Of course, vehicle headlamps could flash for other reasons; and process 800 attempts to verify that the flashing of the headlamps or other response was not coincidence.

As discussed above, process 800 could be executed at the UAV 14 using so-called real-time image processing techniques (e.g., as part of blocks 730 and/or 735). Or UAV 14 may execute process 800, but not in real-time. Or process 800 may be carried out by computer 12—e.g., once UAV 14 provides it with recorded image data. For purposes of illustration only—and not to be limiting, process 800 will be described with respect to UAV 14 executing the instructional blocks.

Process 800 may begin with block 810 which includes determining a first timestamp (t1) of the actuated-onboard trigger (block 725). Recall that that this trigger may be actuated simultaneously or within a predetermined time of the transmission of the wireless command (block 715). For purpose of illustration only again, the actuation will be described as the light source 84 of the indicator 26 being illuminated. Thus, timestamp t1 may correspond with a time when the image data captures the light source 84 in an illuminated state (and this illuminated state could be an indication in video data when the UAV 14 transmitted a wireless command).

In block 820, computer 70 may determine a second timestamp (t2) that corresponds with when a vehicle headlamp illumination event (the feedback response) is captured in the image data. Using timestamps t1 and t2 (in block 830), computer 70 may determine a time interval ($\Delta t$), wherein $\Delta t=|t1-t2|$. As explained more below, the time interval ($\Delta t$) between the trigger actuation and the headlamp illumination may be correlated to the transmission of wireless command by keyfob transmitter 76. For example, if the interval ($\Delta t$) is less than a predetermined threshold (T1) of time, then computer 70 may determine correlation and a higher likelihood that the headlamp illumination was a result of the wireless command (e.g., and not some random occurrence).

In block 840, computer 70 also may determine a headlamp ON duration ($t_{HL\_ON}$). The ON duration may be measured from the time the headlamps emit light to the time when they cease emitting light. For example, in the case of a headlamp flash, this ON duration may be less than 1 or 2 seconds. Further, if the image data includes multiple flashes from the vehicle, each duration may be measured. As will be explained below, the ON duration(s) while locking vehicle doors may be a signature of the sought-after vehicle 16. For example, some make or model vehicles 18 may have different ON durations, different flash or light patterns, etc. If however the image data includes the headlamps 56 actuating ON, but remaining ON (e.g., for any suitable reason; such as the vehicle is about to be driven away), parameter $t_{HL\_ON}$ may be used to demonstrate a lack of correlation to the sought-after vehicle 16, as discussed below.

In block 850 which follows, the time interval ($\Delta t$) may be compared with the first predetermined threshold (T1) and the headlamp ON duration ($t_{HL\_ON}$) may be compared with a second predetermined threshold (T2). According to one example, if $\Delta t<T1$ (i.e., if the time between wireless command and headlamp flashing is less than a threshold) and $t_{HL\_ON}<T2$ (i.e., if the time the headlamps were actually ON is less than a threshold), then process 800 proceeds to block

860, wherein computer 70 determines that the specific vehicle 16 has been identified (e.g., with a high likelihood of accuracy). However, if in block 850 the computer 70 determines that Δt is not less than T1 or that $t_{HL\_ON}$ is not less than T2, then process 800 proceeds to block 870, wherein computer 70 determines that the specific vehicle 16 has not been identified.

In the context of computer 70 onboard UAV 14 executing process 800, this process may be repeated each time UAV 14 detects headlamp light emissions within its field-of-view. In this manner, processing power and capabilities are reserved onboard UAV 14—e.g., as the UAV does not execute this set of instructions with each wireless transmission.

In the context of computer 12 executing process 800, computer 12 may parse the image data and identify segments of image data the comprise headlamp light emissions, and then identify the vehicle 16 using interval Δt, duration $t_{HL\_ON}$, threshold T1, threshold T2, etc., as well as other correlation data provided by the UAV 14. In this manner, computer 12 also conserves computational capabilities by not executing process 800 for each waypoint 48 in parking region 20.

Turning now to process 900, a process is illustrated wherein the UAV 14 captures image data of the parking region 20—e.g., waypoint-by-waypoint 48—and provides the image data to plant computer 12 for image processing that is used to identify the vehicle 16 and its location data. As explained below, in at least one example, the image data may be provided to computer 12 after the UAV 14 has traversed all the waypoints 48 of parking region 20.

Process 900 begins with block 905, 910, 915, 920, and 925. These blocks may be respectively identical or similar to blocks 705, 710, 715, 720, and 725 described above (process 700); therefore, they will not be re-described here.

In block 970 which follows block 925, UAV 14 may determine whether it has executed blocks 910-925 for each of the waypoints in a predetermined or pre-programmed series of waypoints 48 associated with parking region 20 (e.g., has it scanned and received image data at all the waypoints 48?). If it has not, process 900 may loop back and repeat blocks 910-925 (e.g., for each waypoint 48). If all the waypoints 48 in parking region 20 have been scanned, then process 900 may proceed to block 975.

In block 975, UAV 14 provides the image data to computer 12. As discussed above, this may occur by wired transmission (e.g., via the docking station) or via wireless transmission (e.g., using transceiver 74). Further, it may occur as streaming data, as a collection of piecemeal transmissions, or as a single download or delivery. Regardless of the manner of delivery, following block 975, the process proceeds to block 980.

Block 980 may be similar to block 730. In block 730, the image data of the parking region 20 was being parsed in a piecemeal fashion. Here, in at least one example, all the image data may be available to computer 12. Thus, in at least one example of block 980, computer 12 parses the image data to find any potential feedback responses from one or more vehicles 18 in the parking region 20. Continuing with the example set forth above, this may include parsing video data recorded by UAV sensor 22 to find instances of headlamp light emissions.

Having determined these instances, process 900 may proceed to block 985 and attempt to identify vehicle 16 from the video data. According to at least one example of block 985, this may include executing process 800, discussed above. Therefore, the instructions which may be carried out to determine the identification will not be re-discussed here.

In block 990 which follows, having identified the vehicle 16, computer 12 may identify location data associated with the particular vehicle 16. This instruction may be similar or identical to block 740; therefore, it will not be repeated here either.

Having identified the vehicle 16 and its location data, the location data may be provided to the service technician who then may retrieve the vehicle 16, as described above. Following block 990, process 900 may execute block 995 which may be similar or identical to block 750 (e.g., whether to locate another vehicle). If another vehicle is to be located, then process 900 may continue to block 905—wherein computer 12 may provide (and UAV 14 may receive) another unique identifier. Else, process 900 ends.

Figure 3:
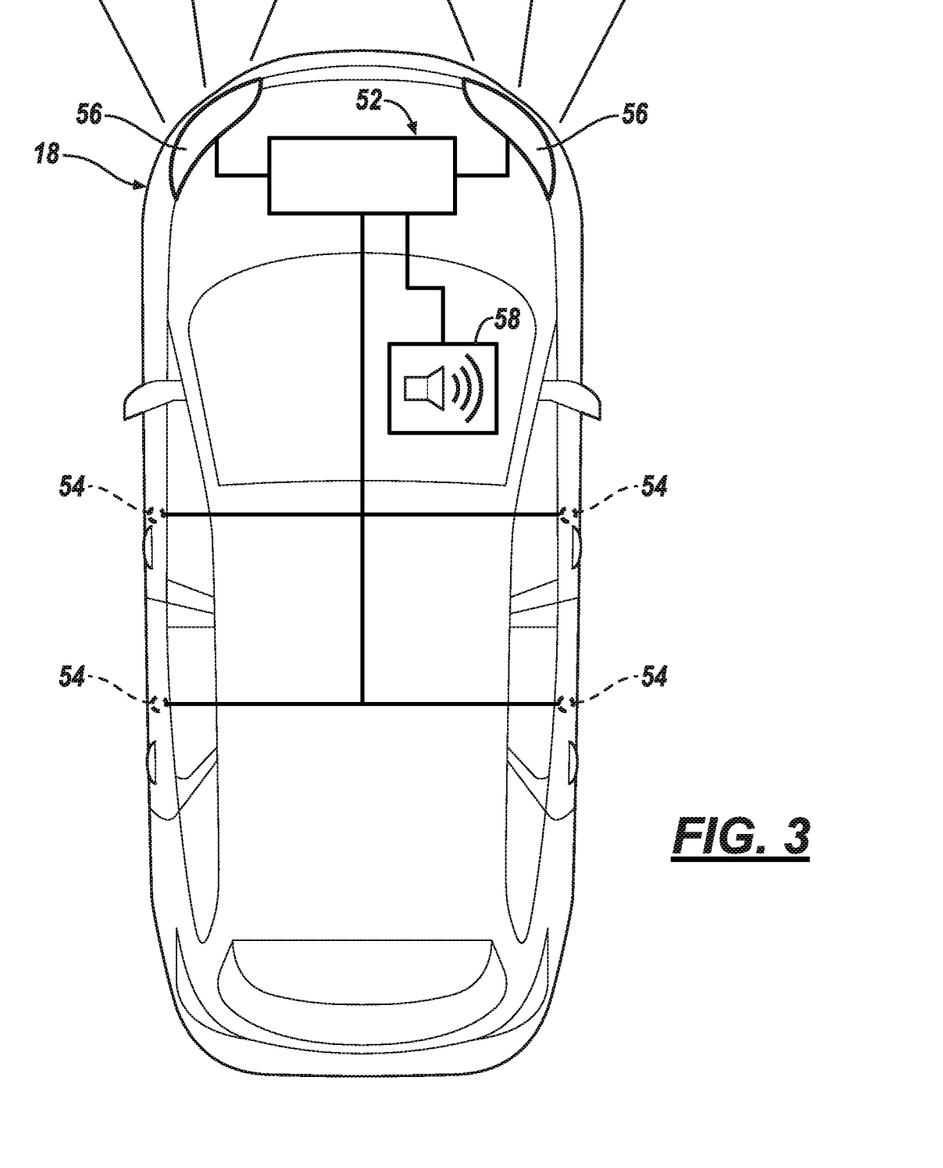
FIG. 3 is a schematic diagram of an exemplary vehicle which may be located in the parking region.

Other examples of vehicle 16 exist as well. For example, computer 52 may be programmed so that it is responsive to keyfob-like commands—e.g., using similar protocols and/or similar frequencies. In at least one example, the computer 52 may be programmed with special instructions that do not require rolling the keyfob codes either at the UAV 14 or vehicle 16.

Thus, there has been described a vehicle locating system that includes a computer and an unmanned aerial vehicle (UAV). The computer and/or UAV are programmed to receive and/or analyze image data of a vehicle parking region, wherein the image data includes a feedback response from a specific vehicle based on a wireless command sent from the UAV. The wireless command includes a unique identifier which causes the specific vehicle to respond.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
a computer, comprising a processor, and a memory storing instructions executable by the processor, the instructions comprising instructions to:
receive, from an unmanned aerial vehicle (UAV), image data of a vehicle parking region;
process the data by identifying an actuation of a UAV indicator that occurs within a predetermined interval of a feedback response of a vehicle in the region; and
based on the identification, determine a location of the vehicle within the region; and
the UAV, wherein the UAV is programmed to record the image data and repeatedly emit a wireless command to trigger the response as it moves from waypoint-to-waypoint within the region, wherein the command comprises a keyfob code of the vehicle, wherein the UAV is programmed to operate in a plant mode which inhibits the UAV from rolling the code.

2. The system of claim 1, wherein the response comprises a light pattern emitted from the vehicle in response to a trigger from the UAV.

3. The system of claim 1, wherein the indicator comprises a light source located within a field of view of a sensor onboard the UAV.

4. The system of claim 1, further comprising a plurality of vehicles in the region including the vehicle that provides the response, wherein each of the plurality of vehicles comprise an onboard computer programmed to execute the response when the UAV provides a wireless command that corresponds with a keyfob code stored in the respective onboard computer.

5. An unmanned aerial vehicle (UAV), comprising:
a computer, comprising a processor, and a memory storing instructions executable by the processor;
a sensor; and
a keyfob transmitter;
an indicator located within a field of view of the sensor, wherein the indicator comprises a light source;
the instructions comprising instructions to:
receive, via the sensor, image data of a vehicle parking region;
transmit a wireless command via the transmitter, and, concurrently, to actuate the light source; and
based on the transmission, receive, via the sensor, and record, a visual feedback response from a vehicle in the region;
repeatedly transmit the command at a plurality of waypoints in the region while recording image data, wherein the data comprises the response and an actuation of the indicator; and then
transmit the data to a second computer for video image processing,
wherein the processing includes identifying the vehicle based on both the actuation and the response occurring within a predetermined interval.

6. The UAV of claim 5, wherein the sensor is a digital camera.

7. The UAV of claim 5, wherein the image data is video data.

8. The UAV of claim 5, wherein the response comprises a light pattern emitted from a headlamp of the vehicle.

9. The UAV of claim 5, wherein the indicator is coupled adjacent an aperture of the sensor.

10. The UAV of claim 5, wherein the instructions further comprise instructions to determine location data associated with the vehicle providing the response.

11. The UAV of claim 5, wherein the instructions further comprise, to:
process the image data at the UAV;
based on the processing, determine location data of the vehicle; and
provide the location data to a second computer.

12. A system, comprising the UAV of claim 11 and the second computer that is programmed to maintain a database of keyfob codes for a plurality of vehicles, wherein the command transmitted by the UAV includes one of the codes.

13. A method, comprising:
receiving, from an unmanned aerial vehicle (UAV), image data of a vehicle parking region;
processing the data by identifying an actuation of a UAV indicator that occurs within a predetermined interval of a feedback response of a vehicle in the region; and
based on the identification, determining a location of the vehicle;
wherein the UAV records the image data and repeatedly emits a wireless command to trigger the response as it moves from waypoint-to-waypoint within the region, wherein the command comprises a keyfob code of the vehicle, wherein the UAV operates in a plant mode which inhibits the UAV from rolling the code.

14. The method of claim 13, wherein the response is triggered by the UAV emitting a keyfob code in a direction of the vehicle.

15. The method of claim 13, wherein the indicator comprises a light source located within a field of view of the image data and the response comprises a light pattern emitted by the vehicle.

16. A system, comprising:
an unmanned aerial vehicle (UAV) and a second computer;
wherein the UAV comprises:
a first computer, comprising a first processor and a first memory storing first instructions executable by the first processor;
a sensor; and
a keyfob transmitter;
the first instructions comprising instructions to:
receive, via the sensor, image data of a vehicle parking region;
process the image data at the UAV;
based on the processing, determine location data of the vehicle; and
provide the location data to a second computer;
transmit a wireless command via the transmitter; and
based on the transmission, receive, via the sensor, and record, a visual feedback response from a vehicle in the region;
wherein the second computer comprises a second processor and a second memory storing second instructions executable by the second processor, including instructions to maintain a database of keyfob codes for a plurality of vehicles, wherein the command transmitted by the UAV includes one of the codes.

17. The system of claim 16, wherein the response comprises a light pattern emitted from a headlamp of the vehicle.

18. The system of claim 16, further comprising an indicator located within a field of view of the sensor.

19. The system of claim 18, wherein the indicator comprises a light source, wherein the instructions further comprise: to transmit the command and, concurrently, to actuate the source.

20. The system of claim 19, wherein the first instructions further comprise instructions to:
repeatedly transmit the command at a plurality of waypoints in the region while recording image data, wherein the data comprises the response and an actuation of the indicator; and then
transmit the data to a second computer for video image processing,
wherein the processing includes identifying the vehicle based on both the actuation and the response occurring within a predetermined interval.

* * * * *